(12) United States Patent
Scamardo

(10) Patent No.: US 7,958,582 B1
(45) Date of Patent: Jun. 14, 2011

(54) TRAVEL PILLOW

(76) Inventor: Mark C. Scamardo, Lucas, TX (US)

( * ) Notice: Subject to any disclaimer, the term of this patent is extended or adjusted under 35 U.S.C. 154(b) by 0 days.

(21) Appl. No.: 12/892,992

(22) Filed: Sep. 29, 2010

Related U.S. Application Data

(60) Provisional application No. 61/272,689, filed on Oct. 22, 2009.

(51) Int. Cl.
*A47C 20/02* (2006.01)

(52) U.S. Cl. .............. 5/632; 5/637; 297/392; 297/397

(58) Field of Classification Search ...... 5/632, 636–638, 5/655; 297/391–393, 397, 399
See application file for complete search history.

(56) References Cited

U.S. PATENT DOCUMENTS

| | | | | |
|---|---|---|---|---|
| 2,387,079 | A | * | 10/1945 | Lansden ............ 297/392 |
| 4,617,691 | A | | 10/1986 | Monti et al. |
| 4,738,488 | A | * | 4/1988 | Camelio ............ 297/383 |
| 5,129,705 | A | | 7/1992 | Wray |
| 5,154,477 | A | | 10/1992 | Lacy |
| 5,339,472 | A | | 8/1994 | Yin |
| 5,383,711 | A | | 1/1995 | Houghteling |
| 6,088,855 | A | * | 7/2000 | Connolly ............ 5/636 |
| 6,116,691 | A | * | 9/2000 | Reece ............ 297/392 |
| 6,219,865 | B1 | | 4/2001 | Stokesbary |
| 6,230,348 | B1 | | 5/2001 | Patrikakis |
| 6,231,535 | B1 | * | 5/2001 | Mainiero et al. ............ 602/18 |
| 6,266,832 | B1 | * | 7/2001 | Ezell ............ 5/640 |
| 6,625,829 | B2 | * | 9/2003 | Zell ............ 5/637 |
| 6,641,221 | B1 | | 11/2003 | Kastlunger |
| D483,978 | S | | 12/2003 | Smith |
| D486,028 | S | | 2/2004 | Cathey |
| 6,758,526 | B2 | | 7/2004 | Marbutt |
| 6,789,851 | B2 | | 9/2004 | Smith |
| D503,062 | S | | 3/2005 | Nash |
| 6,966,089 | B2 | | 11/2005 | Gold et al. |
| 7,404,222 | B2 | | 7/2008 | Tidwell |
| 2002/0043859 | A1 | | 4/2002 | Smith |
| 2006/0207029 | A1 | | 9/2006 | Bell |
| 2007/0029851 | A1 | | 2/2007 | Nishimoto |
| 2007/0052274 | A1 | * | 3/2007 | Morphew et al. ............ 297/392 |
| 2009/0151079 | A1 | | 6/2009 | Espindola et al. |

FOREIGN PATENT DOCUMENTS

GB 2246292 1/1992

* cited by examiner

*Primary Examiner* — Michael Trettel
(74) *Attorney, Agent, or Firm* — Kenneth L. Tolar

(57) ABSTRACT

A travel pillow includes a U-shaped cushion formed of a pair of spaced side panels, each having a front end, a rear end, a lower surface and an upper surface. The lower surface of each side panel has an upwardly-inclined front portion that extends to a concave, downwardly-facing shoulder indention, proximal the rear end. Interconnecting the front ends of the side panels is a substantially-tubular cross member having a contoured upper surface that nudges the head rearwardly toward a seat backrest when engaged by a falling chin. On the rear end of each side panel is a fastener for engaging a mating fastener positioned on a passenger seat backrest.

6 Claims, 1 Drawing Sheet

TRAVEL PILLOW

CROSS REFERENCE TO RELATED APPLICATIONS

This application is entitled to the benefit of provisional application No. 61/272,689 filed on Oct. 22, 2009, the specification of which is incorporated herein by reference.

BACKGROUND OF THE INVENTION

The present invention relates to a travel pillow for comfortably supporting a vehicle passenger's head.

DESCRIPTION OF THE PRIOR ART

Sleeping in a vehicle passenger seat is always uncomfortable and challenging. Many vehicles are equipped with small travel pillows that are usually positioned between the passenger's head and the seat's headrest. However, the pillow intermittently shifts, waking the passenger and often disturbing an adjacent passenger. Furthermore, the head is usually supported in an awkward position that can cause neck cramps and other spinal ailments. The situation is more critical for infants or toddlers traveling in child-restraint seats who are more likely to continue sleeping while the head is tilted. Prolonged tilting of the head can cause neck strains, cramps and perhaps more severe medical problems. Furthermore, because an infant or toddler has limited muscular development, sudden stops or accelerations when the head is unrestrained can cause serious, whiplash-type injuries. As a result, a driver is often tempted to reposition or support the child's head, which is hazardous.

Various travel pillows exist in the prior art that are purported to overcome many of the above-described problems. The most common travel pillow consists of a U-shaped or C-shaped cushion that encircles the neck to prevent the head from swaying or tilting. However, because a portion of the cushion rests between the nape of the neck and a seat backrest, the chin is forced downwardly, against the chest, which is extremely uncomfortable and disruptive.

Accordingly, there is currently a need for a travel pillow that overcomes the above-described disadvantages associated with conventional travel pillows. The present invention addresses this need by providing a uniquely-designed pillow that minimizes tilting and swaying of the head while guiding it rearwardly toward the seat backrest.

SUMMARY OF THE INVENTION

The present invention relates to a travel pillow comprising a U-shaped cushion formed of a pair of spaced side panels, each having a front end, a rear end, a lower surface and an upper surface. The lower surface of each side panel has an upwardly-inclined front portion that extends to a concave, downwardly-facing shoulder indention. Interconnecting the front ends of the side panels is a substantially-tubular cross member having a contoured upper surface that nudges the head rearwardly toward a seat backrest when engaged by a dropping chin. On the rear end of each side panel is a fastener for engaging a mating fastener positioned on a passenger seat backrest.

It is therefore an object of the present invention to provide a travel pillow that comfortably supports a vehicle passenger's head.

It is another object of the present invention to provide a travel pillow that supports a user's head in a more upright position to prevent neck injuries and discomfort.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
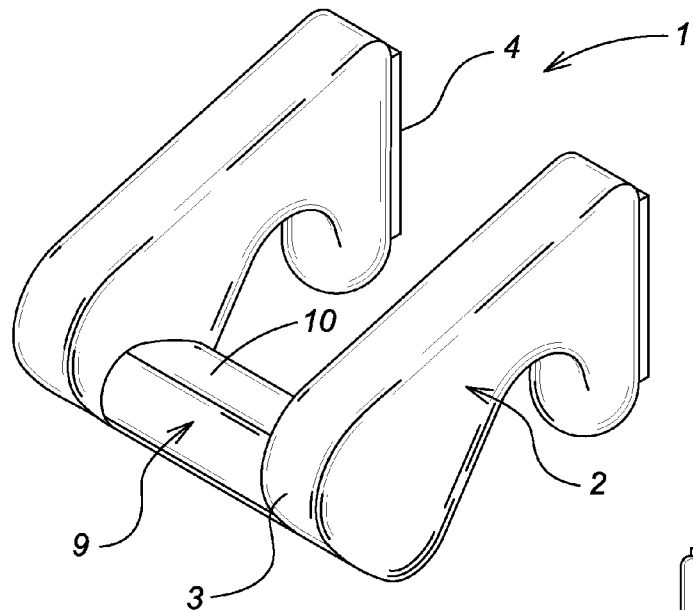
FIG. 1 is a perspective view of the travel pillow according to the present invention.
Figure 2:
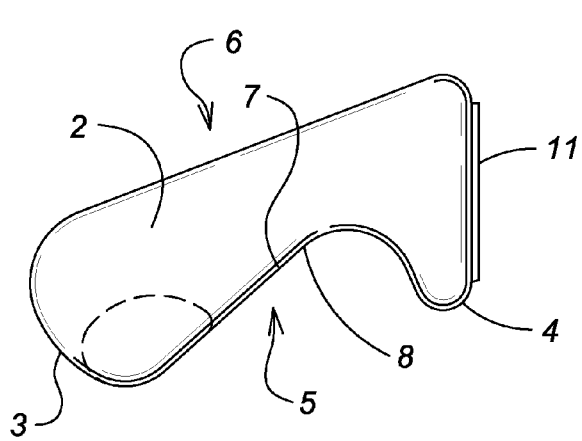
FIG. 2 is a side view of the travel pillow.
Figure 3:
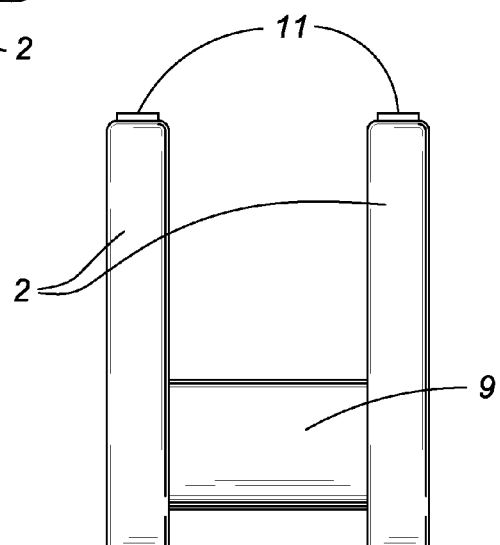
FIG. 3 is a top view of the travel pillow.
Figure 4:
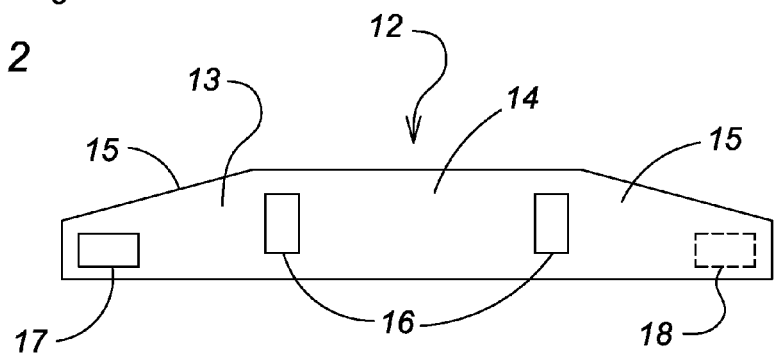
FIG. 4 is a plan view of the headrest cover.

The present invention relates to a travel pillow comprising a U-shaped cushion 1 formed of a pair of spaced side panels 2, each having a front end 3, a rear end 4, a lower surface 5 and an upper surface 6. The lower surface of each side panel has an upwardly-inclined front portion 7 that extends to a concave, downwardly-facing shoulder indention 8 proximal the rear end. Interconnecting the front ends of the side panels is a substantially-tubular cross member 9 having a contoured upper surface 10 that nudges the head rearwardly toward a seat backrest when engaged by a passenger's chin. The cross-member has a smaller diameter and a lower elevation than the side panels so as to easily catch the chin whenever the head falls forward. Accordingly, the high-profile panels minimize lateral tilting of the head while the low-profile cross-member prevents the chin from completely dropping to a passenger's chest. Furthermore, the low-profile cross member does not hinder breathing or obstruct the passenger's forward field-of-vison.

On the rear end of each side panel is a fastener 11, such as a hook-and-loop type that is sold under the trademark VELCRO™, for engaging a mating fastener positioned on the seat backrest. If designed for adult passengers, the pillow is preferably secured to an accompanying headrest cover 12. The cover includes an elongated sheet 13 having an intermediate portion 14 with two opposing end flaps 15 extending therefrom. On the front surface of the intermediate portion are a pair of spaced fasteners 16 that are positioned and oriented to align with the side panel fasteners on the cushion; on the front surface of a first flap is a fastener 17 for mating engagement with a similar fastener 18 on the rear surface of the opposing flap. Accordingly, to install the cover, a user wraps the flaps about a passenger seat headrest and joins the mating flap fasteners.

If the pillow is designed for a child or infant seat, accompanying hook-and-loop patches are adhesively secured to a child seat at an appropriate location to suspend the cushion where a child's head will be comfortably supported. The child seat embodiment is structurally similar to the adult version but is somewhat smaller.

The cushion according to the present invention is preferably constructed with a polyurethane, memory-foam that closely conforms to a passenger's neck, head or face. The cushion is encapsulated by a fabric cover that is constructed with a mixture of polyester and cotton fabric, or a similar material. However, the above-described device is not limited to the exact details of construction and enumeration of parts provided herein. For example, though hook-and-loop fasteners are depicted and described, virtually any fastener can be used to secure the cushion to a backrest. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A travel pillow comprising:
    a U-shaped cushion formed of a pair of spaced side panels, each of said side panels having a front end, a rear end, a lower surface and an upper surface, and a substantially-tubular cross member extending from the front end of one of said side panels to the front end of another of said side panels, said cross member having a contoured upper surface that nudges a passenger's head rearwardly toward a seat backrest when engaged by a dropping chin;
    means for attaching the rear end of each of said side panels to a passenger seat.

2. The travel pillow according to claim 1 wherein the lower surface of each of said side panels has an upwardly-inclined front portion that extends to a concave, downwardly-facing shoulder indention for anchoring said cushion on a user's shoulders.

3. The travel pillow according to claim 1 wherein said cross-member has a smaller diameter and a lower elevation than said side panels so as to provide a resting surface for a dropping chin.

4. The travel pillow according to claim 1 wherein said means for attaching the rear end of each of said side panels to a passenger seat comprises:
    a first hook-and-loop fastener on the rear end of each of said side panels;
    a pair of mating hook-and-loop fasteners on said passenger seat.

5. The travel pillow according to claim 1 wherein said means for attaching the rear end of each of said side panels to a passenger seat comprises:
    a headrest cover including an elongated sheet having an intermediate portion with two opposing end flaps extending therefrom, said intermediate portion having a pair of hook-and-loop fasteners thereon;
    means for attaching said cover to a seat headrest;
    a mating hook-and-loop fastener on the rear end of each of said side panels for detachably engaging the fasteners on said intermediate portion.

6. The travel pillow according to claim 5 wherein said means for attaching said cover to a seat headrest comprises:
    a first fastener on a front surface of one of said flaps;
    a second, mating fastener on a rear surface of another of said flaps whereby a user wraps said flaps about a passenger seat headrest and joins said first fastener and said second fastener.

* * * * *